United States Patent [19]
Leech et al.

[11] Patent Number: 6,042,467
[45] Date of Patent: Mar. 28, 2000

[54] TONGUE SQUEEZER

[75] Inventors: Leslie D. Leech; Keizo Ogawa; Ken Johnson, all of Fremont, Nebr.

[73] Assignee: Fremont Beef Co., Fremont, Nebr.

[21] Appl. No.: 09/217,742

[22] Filed: Dec. 21, 1998

[51] Int. Cl.[7] .................................................. A22C 17/02
[52] U.S. Cl. ........................................ 452/138; 452/142
[58] Field of Search .................................. 452/138, 114, 452/142, 9

[56]  References Cited

U.S. PATENT DOCUMENTS

| | | | |
|---|---|---|---|
| 2,660,754 | 12/1953 | Roshko | 452/9 |
| 2,987,759 | 6/1961 | Lapeyre et al. | 452/9 |
| 3,359,595 | 12/1967 | Anderson et al. | 452/9 |
| 4,004,321 | 1/1977 | Harrison et al. | 452/9 |
| 5,823,866 | 10/1998 | Kunig | 452/138 |

FOREIGN PATENT DOCUMENTS 1470526  4/1977  United Kingdom ........................ 452/9

*Primary Examiner*—Willis Little
*Attorney, Agent, or Firm*—Koley, Jessen, Daubman & Rupiper, P.C.; Mark D. Frederiksen

[57]  ABSTRACT

A tongue squeezer includes a cylindrical roller operably mounted on one end of a pivot arm to pivot the roller between a "working" position spaced vertically above a second roller, and an "open" position spaced upwardly away from the second roller. A weight is attached to the pivot arm to bias the first roller downwardly towards the second roller to thereby squeeze a meat product directed between the first and second rollers. A second pair of rollers is operably mounted downstream of the first pair of rollers, with a third roller mounted below a fourth roller. The fourth roller is mounted on a second pivot arm with a weight attached thereto, to apply a biasing force to squeeze the meat product as it is directed between the second pair of rollers, from the first pair of rollers.

13 Claims, 3 Drawing Sheets

TONGUE SQUEEZER

TECHNICAL FIELD

The tongue squeezer of the present invention relates generally to meat processing equipment, and more particularly to an improved apparatus for removing blood from particular meat products.

BACKGROUND OF THE INVENTION

Beef tongue is considered a delicacy by many people in this country, as well as in many foreign countries. However, one problem encountered during the processing of the product is the fact that blood will typically remain within the two longitudinally extending veins along the transverse sides of the tongue, after conventional processing of the cattle at a packing plant.

In many cases, the tongue is not shipped as a whole, but rather is sliced transversely, and shipped in the sliced condition. Any blood which remains within these lateral veins will appear as dark coagulated blood spots on opposing sides of each slice of the mean product.

While the blood is typically not a health concern, the appearance of these spots in every slice of meat is displeasing to most customers, and thereby reduces the value of the product.

SUMMARY OF THE INVENTION

It is therefore a general object of the present invention to provide an apparatus and method for removing blood from the veins of a beef tongue.

Another object of the present invention is to provide an apparatus for removing blood from a beef tongue which is simple to operate, economical to manufacturer and efficiently removes the blood without damaging the meat.

These and other objects of the present invention will be apparent to those skilled in the art.

The tongue squeezer of the present invention includes a cylindrical roller operably mounted on one end of a pivot arm to pivot the roller between a "working" position spaced vertically above a second roller, and an "open" position spaced upwardly away from the second roller. A weight is attached to the pivot arm to bias the first roller downwardly towards the second roller to thereby squeeze a meat product directed between the first and second rollers. A second pair of rollers is operably mounted downstream of the first pair of rollers, with a third roller mounted below a fourth roller. The fourth roller is mounted on a second pivot arm with a weight attached thereto, to apply a biasing force to squeeze the meat product as it is directed between the second pair of rollers, from the first pair of rollers.

DESCRIPTION OF THE PREFERRED EMBODIMENT

Figure 1:
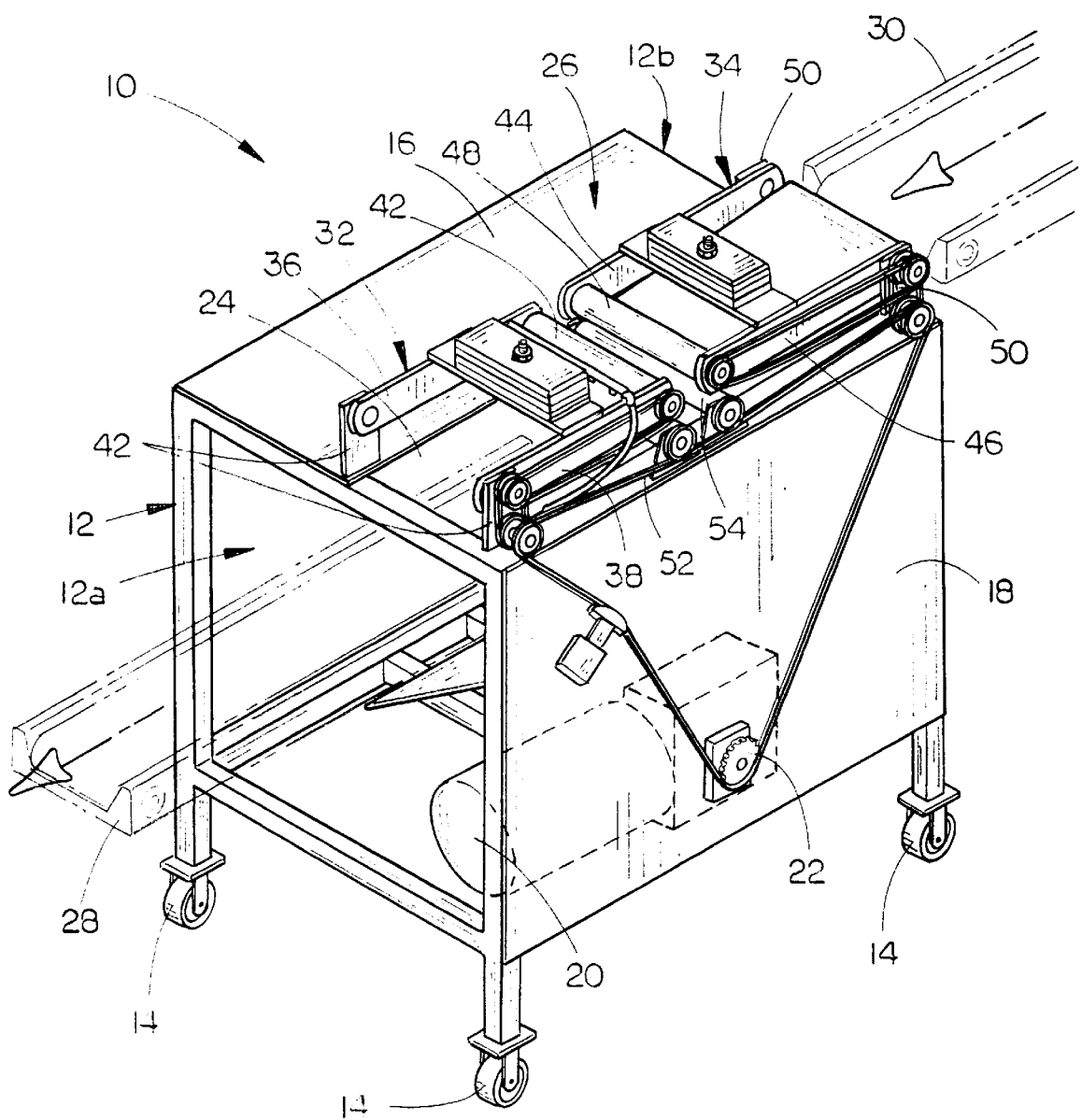
FIG. 1 is a perspective view of the tongue squeezer apparatus of the present invention, with the various safety guards removed.

Referring now to the drawings, in which similar or corresponding parts are identified with the same reference numeral, and more particularly to FIG. 1, the tongue squeezer of the present invention is designated generally at 10 and includes a support frame 12 mounted on a plurality of wheels 14 to permit easy transportability.

Support frame 12 is an open box spring having a top panel 16 and a front panel 18 mounted thereon. A motor 20 is mounted within the interior of frame 12 and is connected to a drive gear 22 projecting from a forward surface of front panel 18.

Frame 12 includes an open forward end 12a and a rearward end 12b. An opening 24 in top panel 16 serves to discharge product into the interior of frame 12, once it has passed through the squeezing apparatus 26. A conveyor 28 is shown in broken lines in FIG. 1, with an up stream end positioned under opening 24, to convey product away from tongue squeezer 10, after processing. Similarly, a conveyor 30 is shown in broken line at the rearward end 12b of frame 12, which may be utilized to convey product to be processed to the tongue squeezer 10. In the alternative, product may be manually fed through the squeezing apparatus 26, and removed manually as well.

Squeezing apparatus 26 includes forward and rearward generally U-shaped pivot arms 32 and 34, operably mounted for pivotable movement on top panel 16. Forward pivot arm 32 includes a pair of parallel legs 36 and 38, connected at one end by a roller 40, to form a general U-shape. The second end of legs 36 and 38 are pivotally connected to a pair of uprights 42 mounted on the forward end of top panel 16 on opposing sides of opening 24. Thus, forward pivot arm 32 will pivot about the second end of legs 36 and 38 from a substantially horizontal working position upwardly to a vertical position, and then outwardly from frame 12a, to reveal top panel 16.

Rearward pivot arm 34 is similar to forward pivot arm 32, and its use of a pair of legs 44 and 46 connected by a roller 48 at a first end, and having legs 44 and 46 pivotally connected at their second ends to uprights 50 at the rearward end of top pnael 16. Rearward pivot arm 34 thereby is operable from a generally horizontal position coplanar with pivot arm 32 when in the "working" position, and upwardly and outwardly rearward of the rearward end 12b of frame 12 when in the "open" position.

Figure 2:
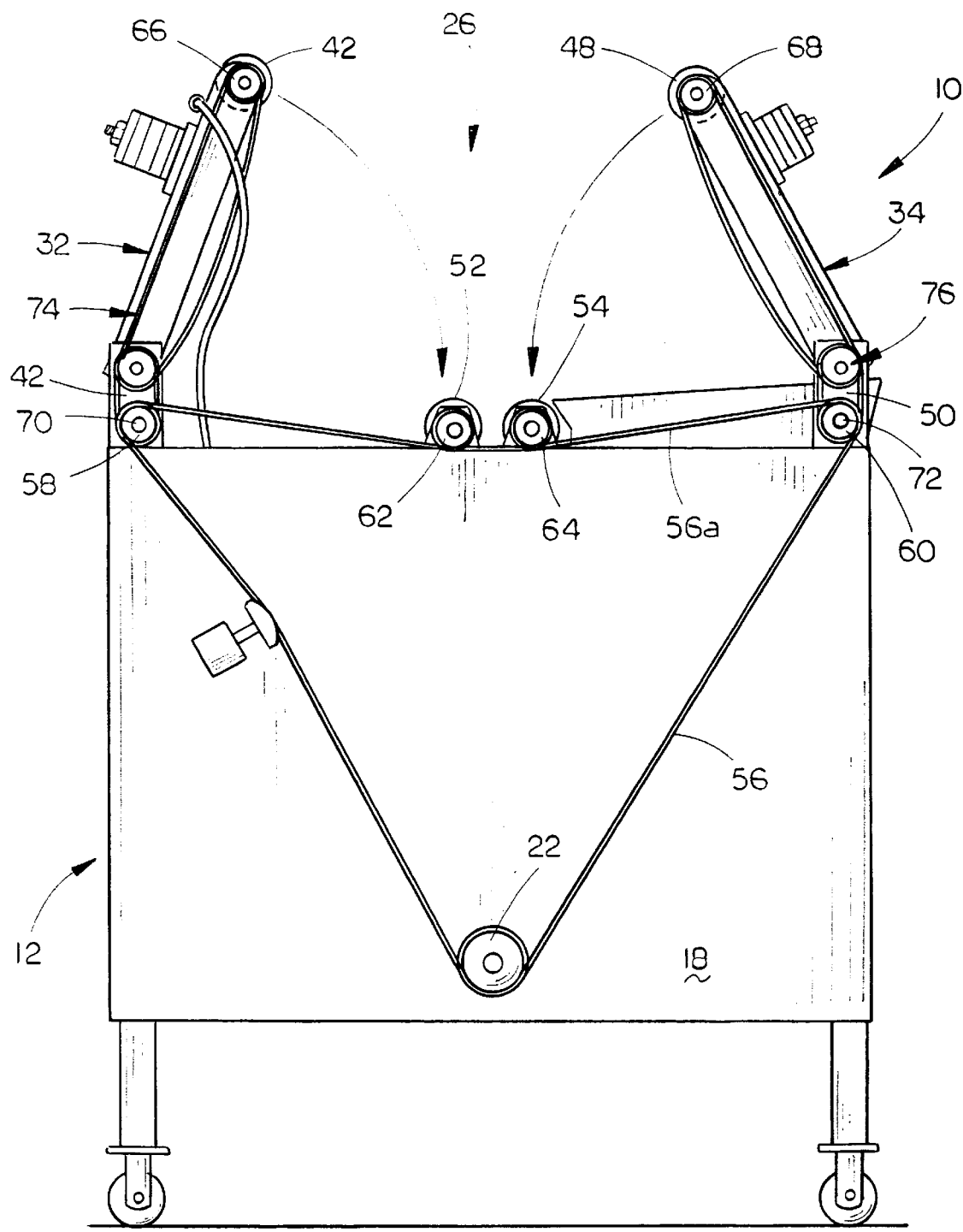
FIG. 2 is a front elevational view of the apparatus with the pressure arms pivoted upwardly to an open position.

Referring now to FIG. 2, a pair of forward and rearward base rollers 52 and 54 are rotatably mounted in parallel spaced apart relationship on top panel 16, in an orientation parallel to rollers 42 and 48 on pivot arms 32 and 34 respectively. Base rollers 52 and 54 are positioned such that rollers 42 and 48 will be vertically aligned over rollers 52 and 54 respectively when pivot arms 32 and 34 are moved to the "working" position shown in FIGS. 1 and 3.

As shown in FIG. 2, rollers 42, 48, 52 and 54 are all driven by drive gear 22. A drive chain 56 extends around drive gear 22 and forward and rearward idler pulleys 58 and 60 on uprights 42 and 50 respectively. One flight 56a of drive chain 56 engages gears 62 and 64 which are directly connected to rollers 52 and 54 respectively, to rotate rollers 52 and 54 in the same direction. Gears 66 and 68 connected to rollers 42 and 48 respectively to rotate the respective rollers upon rotation of the gears. Pulleys 58 and 60 are mounted on shafts 70 and 72 respectively which in turn are connected through conventional chain and pulley systems 74 and 76 respectively to drive gears 66 and 68. Chain and pulley systems 74 and 76 are of a type which will cause rollers 42 and 48 to rotate in a direction opposite to the rotation of rollers 52 and 54.

Figure 3:
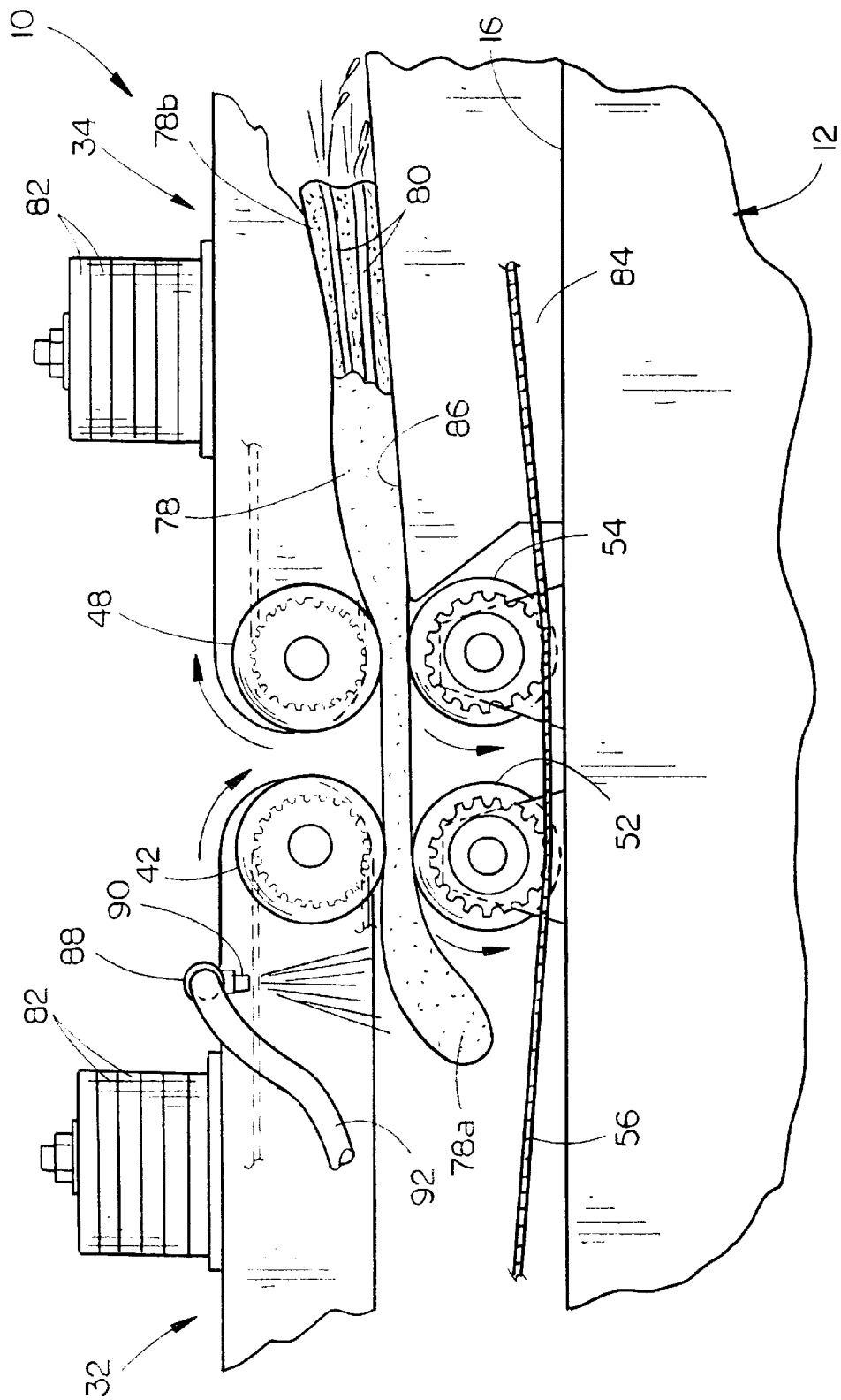
FIG. 3 is an enlarged front elevational view of the apparatus, showing a tongue moving through the apparatus.

Referring now to FIG. 3, pivot arms 32 and 34 are pivoted into the "working" position substantially coplanar and parallel with the top panel 16 of frame 12. When in the working positions, rollers 42 and 48 on pivot arms 32 and 34 are parallel to and vertically aligned with base rollers 52 and 54. Drive chain 56 will drive rollers 52 and 54 to rotate in the same direction, while causing rollers 42 and 48 to rotate in the opposite direction. In this way, a tongue 78 or other product is drawn between the rearward rollers 48 and 54 by the rotation of those rollers, and pushed forwardly until it is drawn between the forward rollers 42 and 52 by the rotation of those rollers. In order to provide a squeezing force to remove blood from veins 80, a plurality of weights 82 are fastened on top of each pivot arm 32 and 34. The amount of weight may thereby be varied so as to produce the exact amount of squeezing force desired between the forward and rearward pairs of rollers.

To assist in delivering the product 78 to the rearward pair of rollers 48 and 54, a table 84 is mounted on top panel 16 rearwardly of rearward base roller 54, with a sloped upper surface 86 leading to the space between rearward rollers 48 and 54. In this way, as the products are fed into the tongue squeezer 10, it is not necessary for the operator to have his hands located close to the rollers, thereby decreasing the possibility of injuries.

A spray bar 88 with a plurality of nozzles 90 is mounted on the forward pivot arm 32 with the nozzles 90 directed downwardly on to the product 78 as it exits the forward rollers 42 and 52. Spray bar 88 is connected via hose 92 to a source of water, or other cleansing solution.

In operation, the product to be squeezed is introduced between the rearward pair of driven rollers 48 and 52, either manually or automatically by conveyor or the like. Both the forward and rearward pairs of rollers 42, 52, 48, and 54 have smooth surfaces, to prevent damage to the surface of the meat product. As the meat product is drawn between the rearward set of rollers 48 and 54, the product will be continuously squeezed from the forward end 78a to the rearward end 78b thereby causing blood within veins 80 to be exspelled from the meat product 78.

The meat product 78 will then pass between forward rollers 42 and 52 to cause a second continuous squeezing action to occur along the length of the meat product 78, and thereby ensure that all blood has been removed from the product. As the product leaves the forward rollers 42 and 52 it is cleaned by spray bar 88 and removed either manually or by a conveyor.

Whereas the invention has been shown and described in connection with the preferred embodiment thereof, many modifications, substitutions and additions may be made which are within the intended broad scope of the appended claims.

We claim:

1. Apparatus for squeezing a meat product to remove blood, comprising:
    a first elongated roller having a smooth cylindrical surface, operably mounted above a support surface;
    a drive means connected to the first roller for rotating the roller;
    means connected to the first roller for biasing the first roller towards the support surface, to squeeze a meat product directed between the roller and the support surface;
    a support table with an upper surface extending from a location proximal to the support surface, to support a meat product and direct it between the first roller and the support surface;
    wherein the support surface is a second roller with a smooth cylindrical surface, parallel to the first roller and spaced therefrom;
    wherein the second roller is connected to the drive means to drive the second roller in a direction opposite the rotation of the first roller;
    a spray bar mounted downstream of the first roller and support surface, having a spray nozzle directed to a location downstream of the first roller to spray a meat product passing out from between the first roller and the support surface;
    a support frame having upper and lower ends and forward and rearward ends, and wherein:
    said first roller is operably mounted on one end of a pivot arm, a second end of the pivot arm pivotally connected to the upper end of the support frame for pivotal movement through a vertical plane; and
    the biasing means includes a weight attached to the pivot arm between the first and second ends;
    a third roller rotatably mounted parallel to the second roller and spaced horizontally forwardly therefrom;
    a fourth roller rotatably mounted parallel to the third roller and spaced vertically thereabove; and
    means connected to the fourth roller for biasing the fourth roller towards the third roller.

2. The squeezing apparatus of claim 1, wherein the third and fourth rollers are connected to the drive means to rotate the third roller in the same direction as the second roller and to rotate the fourth roller in the opposite direction of the second and third rollers.

3. The squeezing apparatus of claim 2, wherein:
    said fourth roller is operably mounted on one end of a second pivot arm, a second end of the second pivot arm pivotally connected to the upper end of the support frame for pivotal movement of the second pivot arm through a vertical plane; and
    the biasing means connected to the fourth roller includes a weight attached to the second pivot arm between the first and second ends thereof.

4. The squeezing apparatus of claim 3, wherein said first pivot arm second end is pivotally connected proximal the rearward end of the support frame;
    wherein the second pivot arm second end is pivotally connected proximal the forward end of the support frame;
    wherein the pivot axes of the first and second pivot arms are parallel; and
    wherein said first and second pivot arms are operably positioned for pivotal movement between a "working" position generally coplanar and with the first and fourth rollers positioned proximal one another, and an "open" position wherein the pivot arms are generally coplanar and the first and fourth rollers are positioned forwardly and rearwardly of the support frame, respectively.

5. The squeezing apparatus of claim 1, further comprising a spray bar mounted downstream of the first roller and support surface, having a spray nozzle directed to a location downstream of the first roller to spray a meat product passing out from between the first roller and the support surface.

6. The squeezing apparatus of claim 1, further comprising a support frame having upper and lower ends and forward and rearward ends, and wherein:
    said first roller is operably mounted on one end of a pivot arm, a second end of the pivot arm pivotally connected to the upper end of the support frame for pivotal movement through a vertical plane; and
    the biasing means includes a weight attached to the pivot arm between the first and second ends.

7. Apparatus for squeezing a meat product to remove blood, comprising:
- a first elongated roller having a smooth cylindrical surface, operably mounted above a support surface;
- a drive means connected to the first roller for rotating the roller;
- means connected to the first roller for biasing the first roller towards the support surface, to squeeze a meat product directed between the roller and the support surface;
- said support surface being a second roller with a smooth cylindrical surface, parallel to the first roller and spaced therefrom;
- a third roller rotatably mounted parallel to the second roller and spaced vertically thereabove; and
- a fourth roller rotatably mounted parallel to the third roller and spaced vertically thereabove; and
- means connected to the fourth roller for biasing the fourth roller towards the third roller.

8. The squeezing apparatus of claim 7, wherein the third and fourth rollers are connected to the drive means to rotate the third roller in the same direction as the second roller and to rotate the fourth roller in the opposite direction of the second and third rollers.

9. The squeezing apparatus of claim 8, wherein:
- said fourth roller is operably mounted on one end of a second pivot arm, a second end of the second pivot arm pivotally connected to the upper end of the support frame for pivotal movement of the second pivot arm through a vertical plane; and
- the biasing means connected to the fourth roller includes a weight attached to the second pivot arm between the first and second ends thereof.

10. The squeezing apparatus of claim 9, wherein said first pivot arm second end is pivotally connected proximal the rearward end of the support frame;
- wherein the second pivot arm second end is pivotally connected proximal the forward end of the support frame;
- wherein the pivot axes of the first and second pivot arms are parallel; and
- wherein said first and second pivot arms are operably positioned for pivotal movement between a "working" position generally coplanar and with the first and fourth rollers positioned proximal one another, and an "open" position wherein the pivot arms are generally coplanar and the first and fourth rollers are positioned forwardly and rearwardly of the support frame, respectively.

11. Apparatus for squeezing a meat product to remove blood, comprising:
- a first elongated roller having a smooth cylindrical surface operably mounted on a support frame;
- a second elongated roller having a smooth cylindrical surface operably mounted on the support frame below, parallel and spaced from the first roller;
- a drive means connected to the first roller for rotating the first roller;
- means connected to the first roller for biasing the first roller towards the second roller, to squeeze a meat product directed between the rollers; and
- a support table with an upper surface extending outwardly from a location proximal and spaced from the rollers, to support a meat product and direct it between the rollers.

12. The squeezing apparatus of claim 11, wherein the second roller is connected to the drive means to rotate the second roller in a direction opposite the rotation of the first roller.

13. The squeezing apparatus of claim 11, wherein said support frame includes upper and lower ends and forward and rearward ends, and wherein:
- said first roller is operably mounted on one end of a pivot arm, a second end of the pivot arm pivotally connected to the upper end of the support frame for pivotal movement through a vertical plane; and
- the biasing means includes a weight attached to the pivot arm between the first and second ends.

* * * * *